United States Patent [19]

Smith

[11] Patent Number: 5,920,129
[45] Date of Patent: Jul. 6, 1999

[54] UNINTERRUPTIBLE POWER SUPPLY HAVING SOLID STATE TRANSFER SWITCH AND METHOD OF OPERATION THEREOF

[75] Inventor: William C. Smith, Garland, Tex.

[73] Assignee: Lucent Technologies Inc., Murray Hill, N.J.

[21] Appl. No.: 09/003,980

[22] Filed: Jan. 7, 1998

[51] Int. Cl.$^6$ ........................................................ H02J 7/09
[52] U.S. Cl. ................................. 307/64; 307/85; 307/87; 361/65; 361/67
[58] Field of Search .................................. 307/64, 66, 87, 307/86, 85, 130; 361/65, 67

[56] References Cited

U.S. PATENT DOCUMENTS

| | | | |
|---|---|---|---|
| 3,942,028 | 3/1976 | Baker | 307/66 |
| 4,323,788 | 4/1982 | Smith | 307/66 |
| 4,340,823 | 7/1982 | Miyazawa | 307/66 |
| 4,761,563 | 8/1988 | Ross et al. | 307/87 |

*Primary Examiner*—Albert W. Paladini

[57] ABSTRACT

An uninterruptible power supply (UPS) for supplying DC power to a load and a method of providing uninterruptible DC power to a load. In one embodiment, the UPS includes: (1) a first stage rectifier that rectifies AC input power received from a primary power source into DC power at an intermediate voltage, (2) a second stage rectifier, coupled to the first stage rectifier, that converts the DC power at the intermediate voltage into DC power for the load at an output voltage that is lower than the intermediate voltage and (3) a solid state transfer switch, coupled between the first stage rectifier and the second stage rectifier, that transfers secondary input power received from a secondary power source to the second stage rectifier only when a voltage of the secondary input power exceeds the intermediate voltage.

21 Claims, 4 Drawing Sheets

UNINTERRUPTIBLE POWER SUPPLY HAVING SOLID STATE TRANSFER SWITCH AND METHOD OF OPERATION THEREOF

TECHNICAL FIELD OF THE INVENTION

The present invention is directed, in general, to uninterruptible power supplies (UPSs) and, more specifically, to a DC UPS for telecommunications or other equipment that has a solid state transfer switch to allow selection of alternative power sources and method of operating a UPS such that the use of mechanical transfer switches is avoided.

BACKGROUND OF THE INVENTION

It is customary to have an alternate power source for an installation if a primary, commercial power source is lost or becomes unreliable. The alternate power source may take the form of, for example, a generator driven by an internal combustion engine. When a transformation from the commercial power source to the alternate source is required, a transfer switch is used to disconnect the commercial power source and thereafter to connect the alternate power source to the load. The transfer switch conventionally provides an open, or break-before-make, transition between the two power sources. More specifically, the transfer switch disconnects the initial commercial power source before connecting the alternate power source to the load. The open transition switching avoids any potential surges that may occur as a result of the two unsynchronized sources applying power to the load simultaneously.

Open transition transfer switches to accommodate the precise application as described above are well known in the art. For instance, transfer switches employing a pair of circuit breakers and a mechanism for operating the two circuit breakers in opposition are a product of former patents. For instance, U.S. Pat. No. 3,778,633 to DeVisser, et al., issued on Dec. 11, 1973, entitled "Automatic Electric Power Source Transfer Apparatus," discloses a device that includes two circuit breakers mounted end-to-end and operated in opposition by a ganging member driven rectilinearly by a screw shaft engaging a traveling nut connected to the ganging member. Another transfer switch of this type uses two side-by-side circuit breakers with handles. The handles are engaged by clevises attached to a lever arm that is rotated about a pivot axis between the two circuit breakers. In still another transfer switch using two side-by-side circuit breakers, a plurality of slides engaging the circuit breaker handles are driven in opposition by gears having an eccentric pin to engage a camming surface on the slide.

The previously-described transfer switches provide open transition operation and thus momentarily interrupt power to the load. However, the open transition switch, where there is absolute and unabridged interruption of power to the load for a period of time, is unacceptable in certain situations. For example, a digital computer will lose the contents of its volatile memory if the power source is severed for even a very short interval. In yet another example, a central office with equipment serving a telephone network cannot be deprived of power for even an instant, or service is lost throughout the network.

To accommodate such critical applications, uninterruptible power supplies (UPSs) have been developed to provide continuous power to the computer or central office equipment should the commercial power source be lost. One embodiment of an uninterruptible power supply takes the form of a battery that is ordinarily charged by a charging device connected to the commercial power system. When commercial power source is lost, the battery provides direct current (DC) power to the load and an inverter coupled to and fed by the battery provides alternating current (AC) power to the load. Conventionally, a special static switch, located in proximity to the inverter, provides a rapid open transfer between the commercial power source and the inverter. The resulting interruption of power only lasts for a few milliseconds, thereby preserving the integrity of the power to the load and not adversely affecting the digital computer, central office equipment or other critical load.

Accordingly, what is needed in the art is an uninterruptible power supply that provides and maintains high quality output power even when transferring to a secondary input power source and employs essentially an automatic transfer switching method using a transfer switch without mechanical moving parts.

SUMMARY OF THE INVENTION

To address the above-discussed deficiencies of the prior art, the present invention provides a UPS for supplying DC power to a load and a method of providing uninterruptible DC power to a load. In one embodiment, the UPS includes: (1) a first stage rectifier that rectifies AC input power received from a primary power source into DC power at an intermediate voltage, (2) a second stage rectifier, coupled to the first stage rectifier, that converts the DC power at the intermediate voltage into DC power for the load at an output voltage that is lower than the intermediate voltage and (3) a solid state transfer switch, coupled between the first stage rectifier and the second stage rectifier, that transfers secondary input power received from a secondary power source to the second stage rectifier only when a voltage of the secondary input power exceeds the intermediate voltage.

The present invention therefore introduces the broad concept of employing a solid state transfer switch in a UPS to draw power from the secondary power source when the secondary power supplied thereby has a voltage that exceeds that of the power supplied by the primary power source. For purposes of the present invention, "uninterruptible power" does not mean that the power can never be interrupted, but rather that the source from which power is derived can be automatically switched from a first (usually primary) source to a second (usually backup) source under certain conditions.

In one embodiment of the present invention, the solid state transfer switch is a secondary rectifier. In a more specific embodiment, the secondary rectifier is a half-wave rectifier.

In one embodiment of the present invention, the secondary input power is selected from the group consisting of: (1) variable frequency AC secondary input power, (2) controlled frequency AC secondary input power and (3) DC secondary input power. The present invention does not require the secondary power to be of a certain quality. Therefore, many types of commercially-available generators may be employed as the secondary power source.

In one embodiment of the present invention, the UPS further comprises a power factor corrector, interposed between the first and second stage rectifier. Those skilled in the art are familiar with power factor correction and the circuitry required to perform such correction.

In one embodiment of the present invention, the UPS further comprises a filter circuit interposed between the first and the second stage rectifier. In an embodiment to be illustrated and described, one or more inductors and capacitors in the UPS cooperate to provide filtering, which may be advantageous in some applications.

In one embodiment of the present invention, the first stage rectifier and the second stage rectifier are contained within a first rectifier module, the UPS comprising a second rectifier module operating in parallel with the first rectifier module. The present invention is therefore adapted for use in modular rectifier systems, wherein multiple rectifier modules are controlled to share the load.

In one embodiment of the present invention, the UPS further comprises a drive circuit that senses the intermediate voltage and turns the solid state transfer switch off when the intermediate voltage falls below a predetermined value. The drive circuit therefore provides a degree of fault isolation should the intermediate voltage fall below a predetermine value. Of course, the predetermined value may be application specific.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
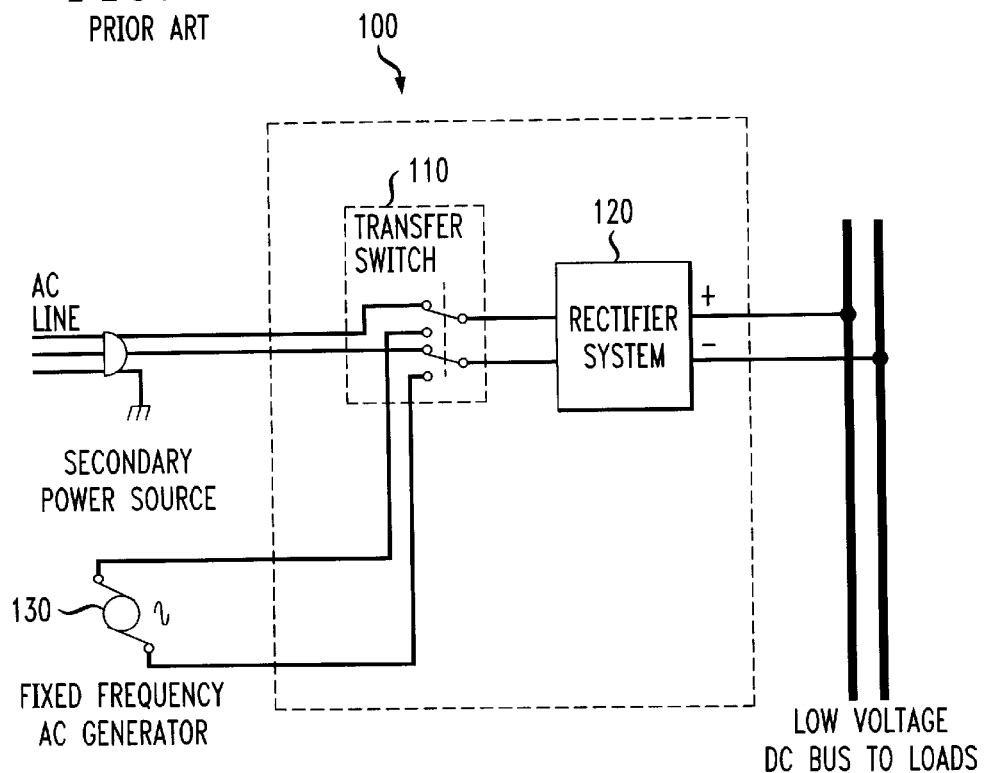
FIG. 1 illustrates a schematic diagram of an uninterruptible power supply employing a prior art transfer switch.

Referring initially to FIG. 1, illustrated is a schematic diagram of an uninterruptible power supply (herein referred to as UPS) 100 employing a prior art transfer switch 110. The UPS 100 is an AC to DC topology showing the transfer switch 110, a rectifier system 120, and an AC generator 130 which functions as a secondary input power source when needed. The secondary input power source 130 is used to power the rectifier system 120 if power from the AC line fails or is interrupted for a period of time.

The transfer switch 110 is normally positioned to connect the AC line voltage to the rectifier system 120. Transfer switch control circuitry (not shown) is well understood in the art and is used to sense the absence of the AC line voltage and reposition the transfer switch 110 to receive power from the AC generator 130 thereby maintaining an essentially constant flow of power to the output loads. The transfer switch 110 is normally a break-before-make variety to prevent connecting the AC line and the AC generator 130 together even for a short time period.

The transfer switch 110 is typically a complex, electromechanical mechanism which is very expensive and which inherently has a finite life time due to its operating characteristics. Additionally, the transfer switch 110 as used in this application constitutes a single point of failure with regard to the UPS 100 itself.

This UPS 100 arrangement generally necessitates the use of a single AC generator 130 as a secondary input power source since additional AC generators would have to be connected in parallel to the single AC generator 130 in this arrangement. Paralleling AC generators is both expensive and difficult to accomplish if additional secondary input power sources are required.

Figure 2:
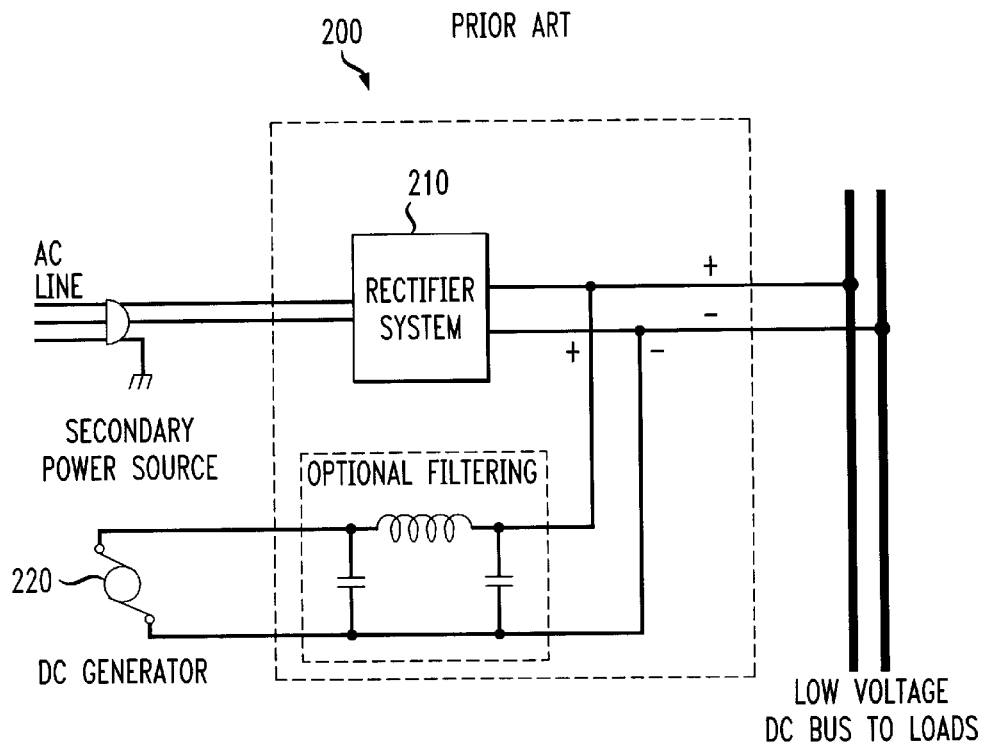
FIG. 2 illustrates a schematic diagram of an uninterruptible power supply employing a rectifier system and a DC generator.

Turning now to FIG. 2, illustrated is a schematic diagram of an uninterruptible power supply (herein referred to as UPS) 200 employing a rectifier system 210 and a DC generator 220. The UPS 200 embodies no transfer switch and therefore eliminates its associated problems. Additionally, by employing the DC generator 220 connected in parallel with the output of the rectifier system 210, the AC line is well isolated from accidental connection with the DC generator 220 output except for the most extreme failure conditions of the rectifier system 210.

This arrangement, however, produces several undesirable effects on the output side of the UPS 200. Since it is directly connected to the output, the DC generator 220 produces output load ripple, noise and regulation problems that were not present in the UPS 100 of FIG. 1 above. Telecommunication systems are typically noise sensitive and when powered from the arrangement such as the UPS 200 their performance degrades unless proper filtering is provided. Filtration is often difficult and expensive to accomplish due to the higher operating currents encountered on the output load side. Additionally, at the low DC output voltages often required (sometimes 24VDC), generator diode efficiency becomes a leading loss factor resulting in greater fuel conception.

In summary, the UPS 100 of FIG. 1 affords excellent output power characteristics providing low noise and high isolation from input power source perturbations. The UPS 100, however, requires the use of a mechanical transfer switch which is complex and expensive and represents a single point of failure. The UPS 200 of FIG. 2 eliminates the requirement for the transfer switch altogether. The output power characteristics of the UPS 200, however, are less desirable and difficult to adequately filter.

Figure 3:
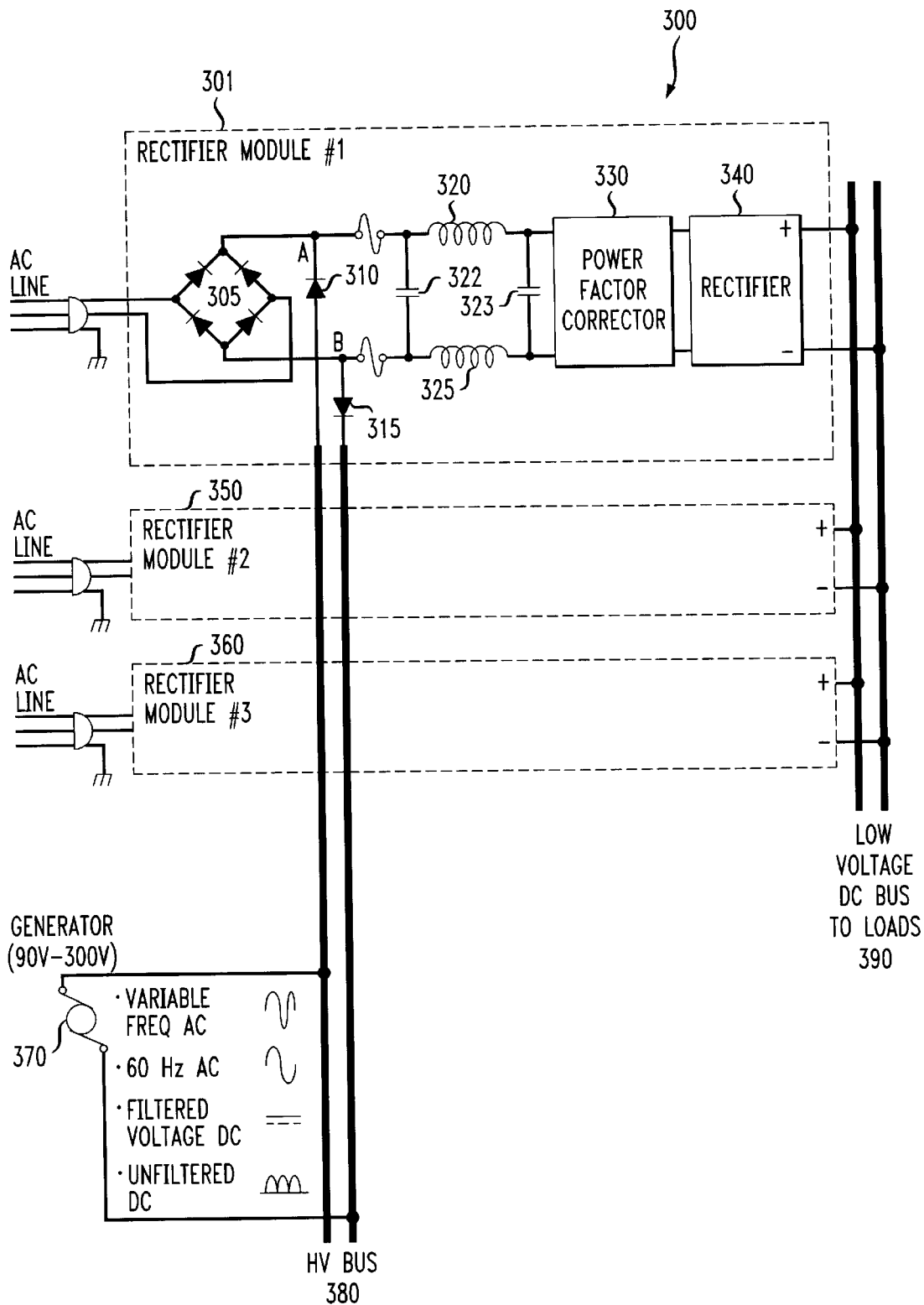
FIG. 3 illustrates a schematic diagram of an embodiment of an uninterruptible power supply constructed according to the principles of the present invention.

Turning now to FIG. 3, illustrated is a schematic diagram of an embodiment of an uninterruptible power supply (herein referred to as UPS) 300 constructed according to the principles of the present invention. In this advantageous embodiment of the present invention, the circuit includes a rectifier module #1 301 containing a first stage rectifier 305 supplied from the AC line, a solid state transfer switch (including a first and second diode 310, 315) connected between a high voltage bus (herein referred to as HV bus) 380 and intermediate voltage nodes A and B, a first and second inductor 320, 325, a power factor corrector 330, and a second stage rectifier 340 connected to a low voltage DC bus 390. The UPS 300 also shows a rectifier module #2 350, a rectifier module #3 360 and a generator 370 as a secondary power source. The generator 370 may supply variable frequency AC, controlled frequency AC or DC voltage.

In its normal operating mode, each rectifier module in the UPS 300 receives input power from the AC line and converts it to an intermediate DC voltage at nodes A, B using the first stage rectifier 305. An intermediate filter comprising the inductors 320, 325 and the capacitors 322, 323 then filters or conditions the intermediate DC voltage presented at nodes A and B. The intermediate voltage is further conditioned by the power factor corrector 330 and presented to the secondary rectifier 340. The secondary rectifier 340 then delivers a highly filtered and conditioned DC voltage to the low voltage DC bus 390 for use by the output loads. The power factor corrector 330 improves the ratio of the actual power delivered to its output, the secondary rectifier 340, compared to the product of the voltage and current delivered to its input.

The quality of the output power delivered through the low voltage DC bus 390 to the output loads is high due to the filtering and conditioning described above. This filtering and conditioning also provides a high degree of isolation to the output loads from any transient disturbances that may occur in the AC lines or at the intermediate voltage nodes A and B.

If the AC line power is interrupted for a period of time, the intermediate voltage at nodes A and B is supplied from the secondary input power generator 370 through the HV bus 380 and the transfer switch diodes 310, 315. The use of the solid state transfer switch diodes 310, 315 in this embodiment provides several advantages over the prior art. First, the solid state transfer switch diodes 310, 315 eliminate the need for expensive, complex, break-before-make mechanical switches used in the prior art. Secondly, the use of the solid state transfer switch diodes 310, 315 can provide automatic or "seamless" transfer to the secondary input power source if its output voltage is maintained available in parallel with the AC line voltage thereby eliminating the need for additional transfer switch control circuitry. This automatic transfer occurs, under the condition above, when the intermediate voltage at nodes A and B decreases to a point where its value is slightly less than the secondary input voltage on the HV bus 380 allowing the transfer switch diodes 310, 315 to conduct and provide secondary input power. Alternately, immediate transfer between the AC lines and the secondary input power generator 370 occurs as soon as it reaches acceptable output voltage. While the solid state transfer switch is illustrated as a pair of diodes, those skilled in the art understand that other solid state switching devices are well within the broad scope of the present invention.

The secondary input power may be supplied from a wide variety of generators including those with variable AC frequencies, controlled AC frequencies or DC voltage outputs. This permits the use of a large selection of generators including those from several different vendors. Inexpensive generators with somewhat "noisy" outputs may also be used due to the excellent filtering and conditioning and large noise rejection capabilities of the rectifier module. In the event that DC voltage generators are used, secondary input power source redundancy may be fairly easily accomplished by operating several generators in parallel. Additionally, this flexibility permits growth capability to be easily accomplished as need dictates.

As the schematic diagram of FIG. 3 indicates, the UPS 300 may be comprised of multiple rectifier modules. Each of these rectifier modules may be added as needed. Each module has a separate AC line input power connection and an output connection to the low voltage DC bus 390 as shown. Each module is connected to the HV bus 380 through separate solid state transfer switches. The HV bus 380 could also be subdivided or further "modularized" to provide additional overall redundancy.

The modular nature of the UPS 300 provides not only general expandability but also high reliability in that it also has a high degree of fault tolerance. A shorted transfer switch fault may be protected through proper fusing allowing isolation of the HV bus 380. Multiple rectifier modules provide the capability to allow the UPS to remain operational if one or possibly several of the rectifier modules become inoperable. Multiple failures would typically have to occur for the UPS to become inoperable itself.

Figure 4A:
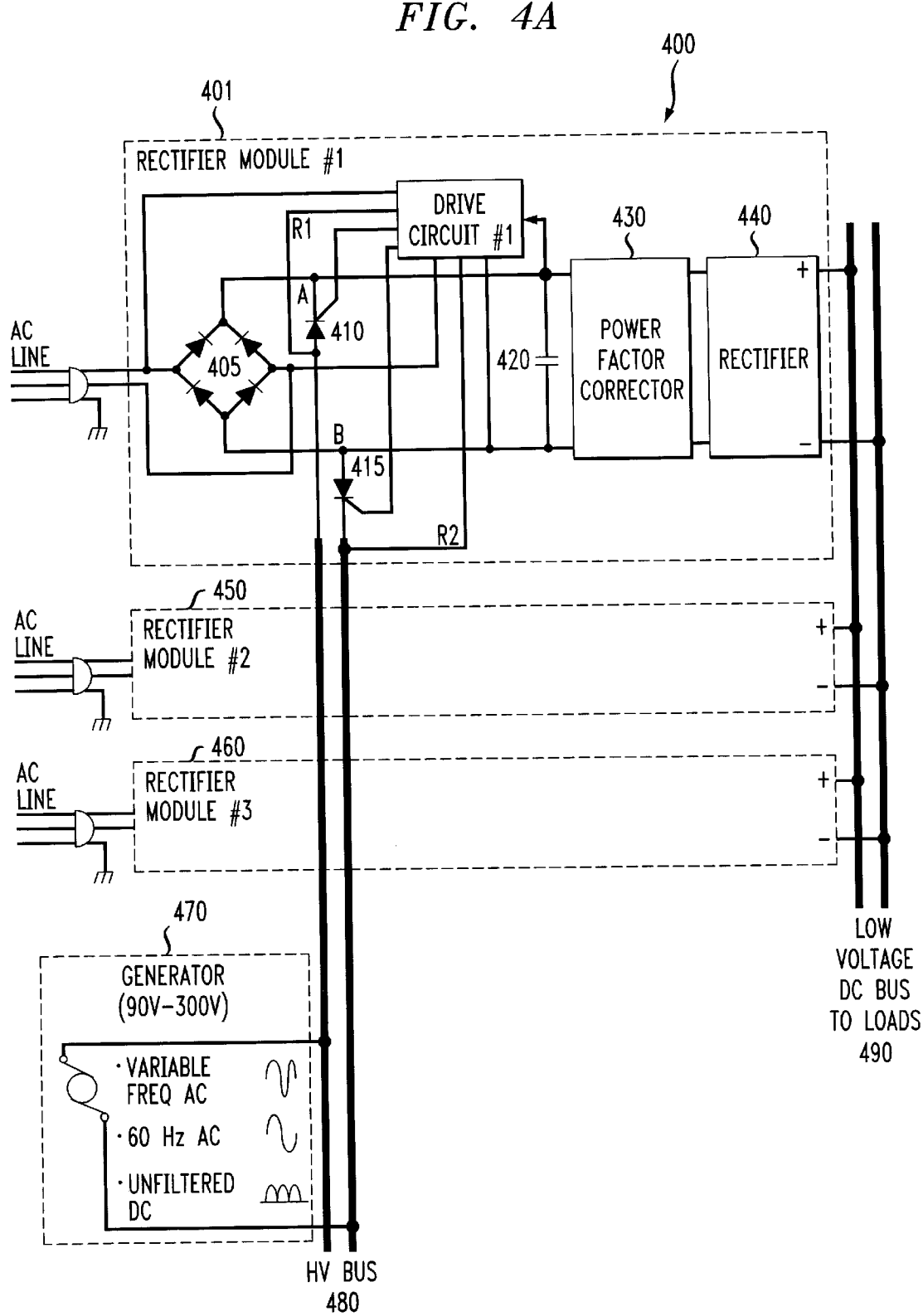
FIGS. 4A and 4B illustrate schematic diagrams of alternate embodiments of uninterruptible power supplies constructed according to the principles of the present invention.
Figure 4B:
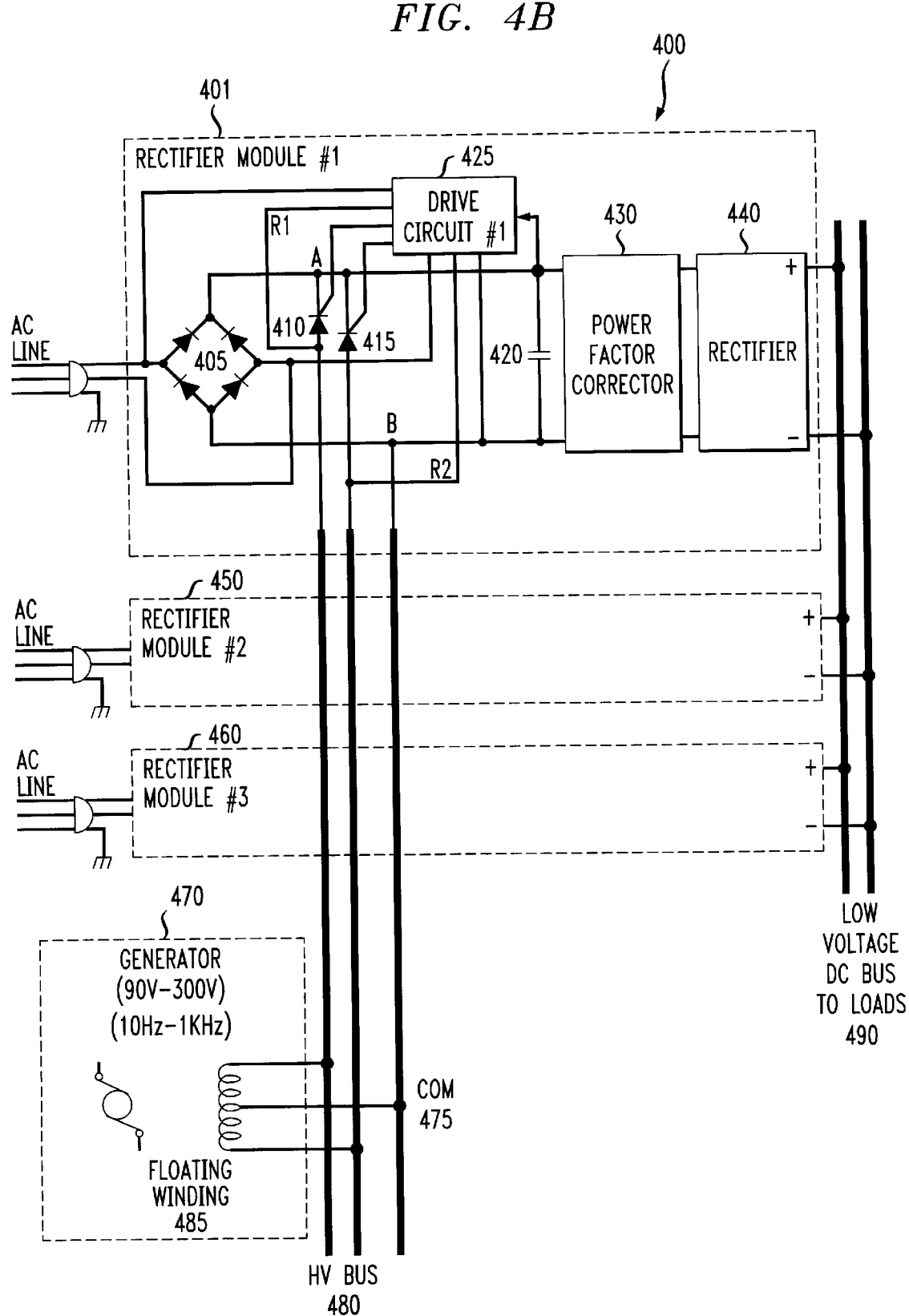

Turning now to FIGS. 4A and 4B, illustrated are a schematic diagrams of alternate embodiments of uninterruptible power supplies (herein referred to as UPS) 400 constructed according to the principles of the present invention. In these alternate embodiments of the present invention, the solid state transfer switches 410, 415 are logical-controlled elements such as silicon controlled rectifiers (SCRs). These elements normally connect the output of the secondary power generator 485 to intermediate voltage nodes A, B when the primary power from the AC line fails. All of the fail safe and flexibility features discussed for the UPS 300 of FIG. 3 also apply for the UPS 400. It should be noted that the other intermediate filter elements of FIG. 3 are not shown. The UPS 400 provides an additional fault isolation feature should the intermediate voltage fall below a predetermined value (e.g., if the filter capacitor 422 should become shorted).

In these cases, Drive Circuit #1, 425 (a silicon bilateral switch may be employed) will sense the shorted condition across filter capacitor 422 (e.g., when a voltage across the filter capacitor 422 falls below a predetermined value) and cause the solid state transfer switches 410, 415 to become non-conducting and thereby isolate the secondary power generator 485 from the failed Rectifier Module #1. This allows UPS 400 to continue operation using the reminder of the Rectifier Modules provided.

For a better understanding of power supplies, including UPSs, see *Basic Principles of Power Electronics* by Klemens Hermann, published by Springer-Verlag, Berlin, Heidelberg (1986).

Although the present invention has been described in detail, those skilled in the art should understand that they can make various changes, substitutions and alterations herein without departing from the spirit and scope of the invention in its broadest form.

What is claimed is:

1. An uninterruptible power supply (UPS) for supplying DC power to a load, comprising:
    a first stage rectifier that rectifies AC input power received from a primary power source into DC power at an intermediate voltage;
    a second stage rectifier, coupled to said first stage rectifier, that converts said DC power at said intermediate voltage into DC power for said load at an output voltage that is lower than said intermediate voltage; and
    a solid state transfer switch, coupled between said first stage rectifier and said second stage rectifier, that transfers secondary input power received from a secondary power source to said second stage rectifier only when a voltage of said secondary input power exceeds said intermediate voltage.

2. The UPS as recited in claim 1 wherein said secondary input power is selected from the group consisting of:
    variable frequency AC secondary input power,
    controlled frequency AC secondary input power, and
    DC secondary input power.

3. The UPS as recited in claim 1 further comprising a power factor corrector, interposed between said first and second stage rectifier.

4. The UPS as recited in claim 1 further comprising a filter circuit interposed between said first and second stage rectifier.

5. The UPS as recited in claim 1 wherein said first stage rectifier and said second stage rectifier are contained within a first rectifier module, said UPS comprising a second rectifier module operating in parallel with said first rectifier module.

6. The UPS as recited in claim 1 further comprising a drive circuit that senses said intermediate voltage and turns said solid state transfer switch off when said intermediate voltage falls below a predetermined value.

7. The UPS as recited in claim 1 wherein said solid state transfer switch is a secondary rectifier.

8. The UPS as recited in claim 7 wherein said secondary rectifier is a half-wave rectifier.

9. A method of providing uninterruptible DC power to a load, comprising the steps of:

rectifying AC input power received from a primary power source into DC power at an intermediate voltage with a first stage rectifier;

converting said DC power at said intermediate voltage into DC power for said load at an output voltage that is lower than said intermediate voltage with a second stage rectifier coupled to said first stage rectifier; and transferring secondary input power received from a secondary power source to said second stage rectifier only when a voltage of said secondary input power exceeds said intermediate voltage.

10. The method as recited in claim 9 wherein said solid state transfer switch is a secondary rectifier.

11. The method as recited in claim 9 wherein said secondary rectifier is a half-wave rectifier.

12. The method as recited in claim 9 wherein said secondary input power is selected from the group consisting of:

variable frequency AC secondary input power, controlled frequency AC secondary input power, and DC secondary input power.

13. The method as recited in claim 9 further comprising the step of correcting a power factor of said DC power at said intermediate voltage.

14. The method as recited in claim 9 further comprising the step of passing said DC power at said intermediate voltage through a filter circuit coupled to said second stage rectifier.

15. The method as recited in claim 9 wherein said first stage rectifier and said second stage rectifier are contained within a first rectifier module, said method comprising the step of operating a second rectifier module in parallel with said first rectifier module.

16. The method as recited in claim 9 further comprising the steps of sensing said intermediate voltage and turning off said solid state transfer switch off when said intermediate voltage falls below a predetermined value.

17. An uninterruptible power supply (UPS) for supplying DC power to a load, comprising:

a plurality of rectifier modules, couplable between a primary power source and a low voltage bus coupled to said load, each of said plurality of rectifier modules including:

a full wave, first stage rectifier that rectifies AC input power received from said primary power source into DC power at an intermediate voltage, a power factor corrector, coupled to said first stage rectifier, that corrects a power factor of said DC power at said intermediate voltage, a second stage rectifier, coupled to said power factor corrector, that converts said DC power at said intermediate voltage into DC power for said load at an output voltage that is lower than said intermediate voltage, and a secondary rectifier, coupled between said first stage rectifier and said power factor corrector, that transfers secondary input power to said second stage rectifier only when a voltage of said secondary input power exceeds said intermediate voltage; and a secondary power source, coupled to said secondary rectifier, that supplies said secondary input power to said secondary rectifier.

18. The UPS as recited in claim 17 wherein said secondary rectifier is a half-wave rectifier.

19. The UPS as recited in claim 17 wherein said secondary input power is selected from the group consisting of:

variable frequency AC secondary input power, controlled frequency AC secondary input power, and DC secondary input power.

20. The UPS as recited in claim 17 further comprising a filter circuit interposed between said first and second stage rectifier.

21. The UPS as recited in claim 17 further comprising a drive circuit that senses said intermediate voltage and turns said solid state transfer switch off when said intermediate voltage falls below a predetermined value.

* * * * *